May 23, 1961      D. A. VINCENT      2,984,940
METHOD OF TREATING AND PLANTING CATTAIL SEEDS
Filed July 16, 1959
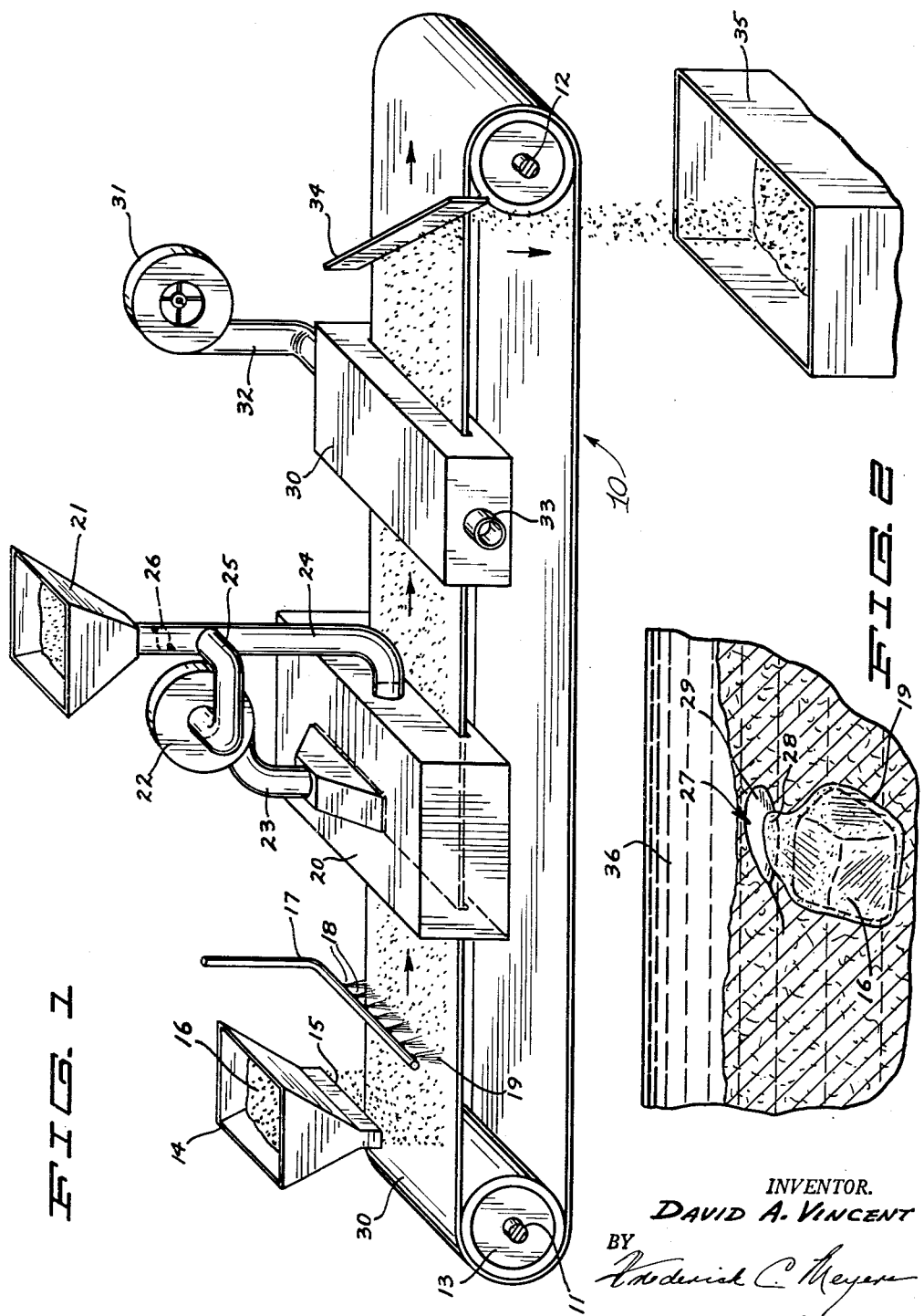
INVENTOR.
DAVID A. VINCENT
BY
Frederick C. Meyers
ATTORNEY

United States Patent Office 2,984,940
Patented May 23, 1961

2,984,940
METHOD OF TREATING AND PLANTING CATTAIL SEEDS

David A. Vincent, Wilton, Minn., assignor to Typha Products, Inc., Bemidji, Minn., a corporation of Minnesota Filed July 16, 1959, Ser. No. 827,994
7 Claims. (Cl. 47—58)

This invention relates to seeding, and more particularly to the treatment and plating of cattail seeds.

Cattails commonly grow at the edges of lakes and ponds or in low areas such as submerged or partially submerged swamplands. The cattail heads have a central spear from which fibrous material extends radially in densely packed form. Since the outer ends of the fibers are coincident with the adjoining fibers, the appearance is somewhat cylindrical in outline and the head has a brownish cast. As the head ages in winter and spring months, the fiber dries and pulls out from the head. The seeds are very small and lie close to the stem where they are attached to the inner ends of the fibers. When the fibers tear loose from the stem, a piece of fluff is formed which has many times the volume of the original compacted fibers. This fluff is extremely light and has a natural water repellance. The wind separates the fluff and seeds from each stem over a period of time and the seeds, together with their fibers, become airborne and are carried to nearby areas where they are usually deposited in exposed places such as dry land or vegetation where the seed eventually is destroyed. Some of the seeds float to the surface of open water and float until the wind carries them to a shoreline. If the water recedes or the seeds reach and become naturally embedded in mud, then a certain percentage of these seeds can germinate and take roots. If the water continues to recede and the mud becomes baked by the sun, then, of course, the plant will not grow but will die. Because of the difficulties encountered by the air-borne fluff in fortuitously finding favorable growing conditions, only a very small percentage of the large number of seeds in each cattail head will ever germinate and grow, and these are almost exclusively in muddy flats, in swamps or adjacent the shorelines of ponds.

It is within the contemplation of the present invention and a general object thereof to provide a method for the intentional culture of cattail plants and for fixing the location of such plants in favorable growing ground where the seeds would not normally germinate and take root.

It is another object of the invention to provide a method of treating cattail seed in such a manner as to cause them to sink rather than to float in water and fluid mud.

Another object of the invention is to provide a method of weighting the normally floating seed to cause the same to submerge and to maintain the seed in moist condition over an extended period of time to permit its germination.

A further object of the invention is to provide a method of effecting the attachment of a cattail seed through a waterproof bond with a weighting particle in such a manner as not to create a waterproofing effect which would prevent germination of the seed.

These and other objects and advantages of my invention will more fully appear from the following description, made in connection with the accompanying drawings, wherein like reference characters refer to the same parts throughout the several views and in which:

Figure 1 is a diagrammatic representation of the method which I employ to treat cattail seeds preparatory to planting; and Figure 2 is a greatly enlarged side elevation of a weighted and bonded cattail seed showing its submerged position and exposed condition to favor germination.

With continued reference to the drawing, my method of treating cattail seed utilizes a flat traveling surface which may conveniently be in the form of the endless belt 10 as shown in Fig. 1. The endless belt may be trained around shaft and roller assemblies 11 and 12 with the belt traveling in the direction of the arrows, as shown. Means for leveling particles upon the belt 10 may be employed adjacent the head end of the endless belt and such means may take the form of a weight eccentric (not shown) secured to the roller 13 of shaft and roller assembly 11. An oscillating vibration may be set up which will tend to thin out particles on the belt to form a single layer as is shown in the art. Other means such as blades, flaps, electrical vibrators and the like (not shown) may be employed for the purpose of thinning out particles into a single layer.

Overlying the head end of the traveling surface 10 is a supply hopper 14 having a discharge slot 15 permitting water insoluble particles 16 to be fed from hopper 14 to the surface of belt 10. An effective and cheap source of the granular waterproof particles is natural sand which has been sized and washed for the purpose herein described. It is important that the particles 16 be of a weighting nature which will sink in water or fluid mud and carry cattail seeds below the surface thereof while overcoming the skin tension which may tend to float the particle and seed. Thus the weighting particles 16 may be produced from any of a large number of substances, provided the particules have a specific gravity greater than 1.0 and are insoluble in water. Although size of the particle is not critical, it is desirable to minimize the bulk of the weighting particles and to promote efficient handling thereof by utilizing uniformly sized particles. In order that the seed be caused to sink in mud or water, the combined specific gravity thereof has a value in excess of 1.0.

In a commercial adaptation of my invention, sand 16 is fed upon the traveling belt 10 and is caused to spread out in a single layer of particles which then pass under a spray head 17 having a plurality of nozzles 18 through which is sprayed a bonding and waterproofing material 19. The bonding and waterproofing material 19 can be any of a multiplicity of substances which can be put into a fluid state and which will have an adhesive quality for bonding to cattail seeds. The substance 19 should not be cohesive after the final treatment of the seeds as hereinafter set forth. It is also important that neither the weighting particles 16 nor the bonding and waterproofing substance 19 have chemical hydrolysis or otherwise be of such a nature as would impair or prevent the germination of the cattail seeds. The bonding and waterproofing material 19 may be rendered fluid by means of a solvent or through melting at low temperatures incapable of injuring the cattail seed or through a combination of the foregoing expedients. Thus I may use polyvinyl acetate in a solvent such as acetone or alcohol and may also use varnishes or unsaturated oils which will oxidize and harden into a non-tacky bond. Other useful bonding materials of the same general class include nitro cellulose, ethyl cellulose, polystyrene, phenol formaldehyde, urea formaldehyde and polyester resin. I may employ waxes and other organic materials having low but sharp melting points. The spray head 17 may apply the bonding and waterproofing material only to a portion of the surface of the individual particles 16 in their layered position or the agitation of the particles may be continued sufficiently along the length of belt 10 to turn them over and cause them to be coated over the entire surface thereof.

As the coated weighting particles proceed along the traveling belt 10, they enter a chamber 20 which surrounds at least the upper stretch of belt 10 where cattail seeds are applied to the weighting particles in such a manner as not to become completely coated and waterproofed. To achieve this purpose, I feed the cattail seeds from a hopper 21 through a blower 22, through the nozzle 23, and into the interior of chamber 20. The air-borne cattail seeds greatly outnumber the coated particles 16 which, at any instant, are present in the chamber 20. In this manner, virtually all of the particles 16 will be contacted by at least one cattail seed and caused to adhere thereto. The excess of the air-borne seeds are exhausted into pipe 24 which, in turn, joins with the inlet feed tube 25 and thereby can recycle a large portion of the air-borne seeds. A valve 26 in the tube 25 controls the rate of addition of new cattail seeds to that which is being recycled.

Referring to Fig. 2, the weighting particle 16 is there shown coated with the bonding and waterproofing material 19 with cattail seed 27 bonded at area 28 in such a manner as to leave the area 29 exposed for absorption of moisture. In order to properly condition the weighting particle 16 and its adhered cattail seed 27 to prevent further coating of the seeds and cohesion between the coated particles 16, I provide another chamber 30 which is designed to remove tackiness from the coating 19 through such means as drying and cooling. The air may be circulated through means of blower 31 and blower tube 32 to the interior of chamber 30 and exhausted to the atmosphere through outlet 33, as shown. It is important that contact be minimized between the individual particles 16 at this point of the procedure so as not to ball the particles together, nor to completely coat the individual seeds 27, or otherwise defeat the character of the limited surface adherence of the cattail seed 27 at area 28 as previously described.

After leaving the chamber 30, the bonded and weighted cattail seeds 27 may be removed from the surface of belt 10 by a doctor blade 34 and collected in a hopper 35, as shown.

The weighted cattail seed is then planted in the water or fluid mud 36, as shown in Fig. 2, the weighting particle 16 overcoming the buoyant effect and the surface tension of the fluid to maintain cattail seed 27 in submerged condition. Since the area 28 is bonded by waterproof material 19, the seed will not loosen and rise to the surface. It is important that the seed 27 remain affixed to the weighting particle 16 since the germination of cattail seeds sometimes requires six weeks or longer. At the same time, the surface 29 remains exposed to moisture and the cattail seeds 27 can thus become softened and properly germinate. Since the coated particle 16 maintains the seed in contact with mud, it can take root and become fixed in locations which the seed would not otherwise naturally reach.

It may thus be seen that I have devised a procedure for preparing and planting cattail seeds which utilizes a physical bond with a weighting particle and yet does not interfere with the moistening and germination of the seed. The concentration and location of cattail plants can thus be controlled accurately in contradistinction to the haphazard feeding and germinating which occurs in nature.

It will, of course, be understood that various changes may be made in the form, details, arrangement and portions of the parts, without departing from the scope of my invention as set forth in the appended claims.

What I claim is:

1. A method of planting a normally floating cattail seed which comprises, applying a waterproof bonding material to a portion of the external area of the seed and to at least a portion of the area of a weighting particle so that the combined material and seed has a specific gravity greater than 1.0, submerging the weighted seed in mud and maintaining the waterproof bond while subjecting the unbonded portion to moisture for germinating and rooting the seed.

2. A method of preparing a cattail seed for planting which consists in, bonding together in a waterproof bond a weighting particle and a cattail seed so that the combined particle and seed has a specific gravity greater than 1.0, and permitting a portion of the area of the seed to remain free of bonding material.

3. A method of preparing a cattail seed for planting which consists in, bonding together in a waterproof bond a particle of sand and a cattail seed so that the combined particle and seed has a specific gravity greater than 1.0, and permitting a portion of the area of the seed to remain free of bonding material.

4. A method of preparing a cattail seed for planting which consists in, coating a weighting particle with a waterproof bonding material and adhering an external area of a cattail seed which is less than its whole area to the coated weighting particle so that the combined particle and seed has a specific gravity greater than 1.0.

5. A method of preparing a cattail seed for planting which consists in, applying a quantity of weighting particles to a flat surface in a single layer of discrete particles, coating the layer of particles with a waterproof bonding material, blowing a multiplicity of air-borne cattail seeds over and against the coated particles to adhere a portion of the area of the seeds to the coated particles, and setting the waterproof bond between the weighting particles and the cattail seed so as to leave an area of the seed exposed for subsequent moisture absorption.

6. A method of preparing a cattail seed for planting which consists in, applying a quantity of weighting particles to a flat surface in a single layer of discrete particles, coating and waterproofing the layer of particles, blowing a mass of air-borne cattail seeds over and against the coated layer of particles to adhere a portion of the external areas of the seeds to the coated particles, collecting and recycling the excess of blown cattail seeds, and rendering the coated weighting particles and seeds noncohesive and maintaining an area of the seed exposed for subsequent moisture absorption.

7. A method of preparing a cattail seed for planting which consists in, coating a weighting particle with a waterproof bonding material harmless to seed germination taken from the class of materials including polyvinyl acetate, nitro cellulose, ethyl cellulose, polystyrene, phenol formaldehyde, polyester resin, and urea formaldehyde, and adhering an external area of cattail seed less than its whole area to the coated weighting particle.

References Cited in the file of this patent

UNITED STATES PATENTS

| | | |
|---|---|---|
| 56,140 | Blessing | July 3, 1866 |
| 2,083,065 | Heyl | June 8, 1937 |

OTHER REFERENCES

Publications:

Country Gentleman (Magazine), volume 5, No. 17, page 262, published April 26, 1855; second column, article "How to Prevent Birds' Pulling Corn."

New Garden Encyclopedia, published 1941 by William H. Wise & Company (New York), page 233, article on "Cat-Tail."

Condensed Chemical Dictionary, fifth edition, published 1956 by Reinhold (New York), pages 357, 879, 884, Definitions of Diatomite, Polyester, Polyurethane Rubber.